US011880900B2

(12) United States Patent
Choksi et al.

(10) Patent No.: US 11,880,900 B2
(45) Date of Patent: *Jan. 23, 2024

(54) PROGRAMMATICALLY PROVIDING INFORMATION IN CONNECTION WITH LOCATION-BASED SERVICES TO SERVICE PROVIDERS

(71) Applicant: Uber Technologies, Inc., San Francisco, CA (US)

(72) Inventors: Maya Paritosh Choksi, San Francisco, CA (US); Christine Tao, San Francisco, CA (US); Andrew Timothy Szybalski, San Francisco, CA (US); John David West, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 289 days.

This patent is subject to a terminal disclaimer.

(21) Appl. No.: 17/220,223

(22) Filed: Apr. 1, 2021

(65) Prior Publication Data

US 2021/0224944 A1    Jul. 22, 2021

Related U.S. Application Data

(63) Continuation of application No. 15/130,018, filed on Apr. 15, 2016, now Pat. No. 11,023,990.

(Continued)

(51) Int. Cl.
*G06Q 50/30* (2012.01)
*G01C 21/34* (2006.01)
(Continued)

(52) U.S. Cl.
CPC ............ *G06Q 50/30* (2013.01); *G01C 21/20* (2013.01); *G01C 21/3438* (2013.01);
(Continued)

(58) Field of Classification Search
None
See application file for complete search history.

(56) References Cited

U.S. PATENT DOCUMENTS 5,404,295 A    4/1995  Katz
6,070,191 A    5/2000  Narendran
(Continued)

FOREIGN PATENT DOCUMENTS

KR    10-2014-0016053    2/2014
WO    WO 2014-030976    2/2014

OTHER PUBLICATIONS

International Search Report and Written Opinion issued in PCT/US2016/027869 dated Jul. 20, 2016
(Continued)

*Primary Examiner* — Eric W Stamber
*Assistant Examiner* — Ashley Y Young
(74) *Attorney, Agent, or Firm* — Mahamedi IP Law LLP

(57) ABSTRACT

A computing device provides a task user interface that includes a first task for a driver a first location associated with the first task of a transport service. The device determines that a current location of the computing device is within a threshold distance or a threshold estimated travel time from the first location and provides a task panel including information specific to the first task, one or more selectable sub-task features, and a selectable feature that the driver selects to indicate that the first task has been completed. The device can receive a user input corresponding to a selection of the selectable feature and provide a second task of the transport service a second location associated with the second task.

20 Claims, 17 Drawing Sheets

Related U.S. Application Data

(60) Provisional application No. 62/147,934, filed on Apr. 15, 2015.

(51) Int. Cl.
  | | | |
  |---|---|---|
  | *G01C 21/20* | (2006.01) | |
  | *G01C 21/36* | (2006.01) | |
  | *G01S 19/42* | (2010.01) | |
  | *G06Q 10/06* | (2023.01) | |
  | *H04L 12/58* | (2006.01) | |
  | *H04L 29/08* | (2006.01) | |
  | *H04W 4/02* | (2018.01) | |
  | *H04L 51/222* | (2022.01) | |
  | *H04L 67/52* | (2022.01) | |
  | *G06Q 10/0631* | (2023.01) | |

(52) U.S. Cl.
  CPC .......... *G01C 21/3667* (2013.01); *G01S 19/42* (2013.01); *G06Q 10/06311* (2013.01); *H04L 51/222* (2022.05); *H04L 67/52* (2022.05); *H04W 4/023* (2013.01)

(56) References Cited

U.S. PATENT DOCUMENTS

| | | | |
|---|---|---|---|
| 6,574,484 B1 | 6/2003 | Carley | |
| 6,874,017 B1 | 3/2005 | Inoue | |
| 8,370,054 B2 | 2/2013 | Crady | |
| 9,684,627 B1* | 6/2017 | Sar .................... | G06Q 10/0631 |
| 2002/0048269 A1 | 4/2002 | Hong | |
| 2004/0260470 A1 | 12/2004 | Rast | |
| 2008/0046326 A1 | 2/2008 | Horstemeyer | |
| 2010/0153279 A1 | 6/2010 | Zahn | |
| 2012/0323642 A1* | 12/2012 | Camp .................... | G06Q 10/06 705/13 |
| 2013/0073327 A1* | 3/2013 | Edelberg ............ | G06Q 10/0631 705/7.13 |
| 2014/0026054 A1 | 1/2014 | Wang | |
| 2014/0108201 A1 | 4/2014 | Frechette | |
| 2014/0129302 A1 | 5/2014 | Amin | |
| 2014/0164126 A1 | 6/2014 | Nicholas | |
| 2014/0229099 A1 | 8/2014 | Garrett | |
| 2014/0370167 A1 | 12/2014 | Garden | |
| 2015/0154538 A1 | 6/2015 | Skaaksrud | |
| 2015/0204684 A1 | 7/2015 | Rostamian | |
| 2015/0223024 A1 | 8/2015 | Abuodeh | |
| 2015/0248689 A1 | 9/2015 | Paul | |
| 2015/0274421 A1 | 10/2015 | Yamada | |
| 2015/0310379 A1 | 10/2015 | Farrelly | |
| 2015/0323332 A1 | 11/2015 | Lord | |
| 2015/0323333 A1 | 11/2015 | Lord | |
| 2015/0323334 A1 | 11/2015 | Lord | |
| 2015/0324734 A1 | 11/2015 | Lord | |
| 2015/0324735 A1 | 11/2015 | Lord | |
| 2015/0324944 A1 | 11/2015 | Lord | |
| 2016/0042303 A1 | 2/2016 | Medina | |
| 2016/0063435 A1 | 3/2016 | Shah | |
| 2016/0078516 A1 | 3/2016 | Alnuwaysir | |
| 2016/0078571 A1 | 3/2016 | Singh | |
| 2016/0132792 A1 | 5/2016 | Rosnow | |
| 2016/0140507 A1 | 5/2016 | Stevens | |
| 2016/0171439 A1 | 6/2016 | Ladden | |
| 2016/0171542 A1 | 6/2016 | Fanous | |
| 2016/0171584 A1 | 6/2016 | Cao | |
| 2016/0307289 A1 | 10/2016 | Choksi | |
| 2016/0328669 A1 | 11/2016 | Droege | |
| 2017/0024789 A1 | 1/2017 | Frehn | |
| 2017/0290345 A1 | 10/2017 | Garden | |
| 2017/0374429 A1 | 12/2017 | Yang | |
| 2018/0025298 A1 | 1/2018 | Baggott | |
| 2018/0189729 A1 | 7/2018 | Droege | |
| 2018/0253805 A1 | 9/2018 | Kelly | |
| 2019/0035037 A1 | 1/2019 | Chase | |
| 2019/0113361 A1 | 4/2019 | Droege | |
| 2020/0065734 A1 | 2/2020 | Szybalski | |
| 2020/0333161 A1 | 10/2020 | Droege | |
| 2020/0374650 A1 | 11/2020 | Jung | |
| 2021/0389155 A1 | 12/2021 | Droege | |
| 2023/0003542 A1 | 1/2023 | Droege | |

OTHER PUBLICATIONS

PreExam Office Action in BR 1120170221314 dated Jun. 16, 2020.
Office Action in AU 2016249122 dated Feb. 25, 2021.
Office Action in AU 2016249122 dated Jun. 20, 2021.

* cited by examiner

PROGRAMMATICALLY PROVIDING INFORMATION IN CONNECTION WITH LOCATION-BASED SERVICES TO SERVICE PROVIDERS

RELATED APPLICATIONS

This application is a continuation of U.S. patent application Ser. No. 15/130,018, filed on Apr. 15, 2016; which claims the benefit of priority to U.S. Provisional Patent Application No. 62/147,934, filed Apr. 15, 2015; the aforementioned applications being incorporated by reference in their entireties.

BACKGROUND

Service providers can communicate with a network service by using mobile computing devices in order to receive instructions or invitations to provide various services. A service provider needs to capable of viewing information about services, that the service provider has agreed to provide, in an organized and effective manner.

DETAILED DESCRIPTION

Figure 1:
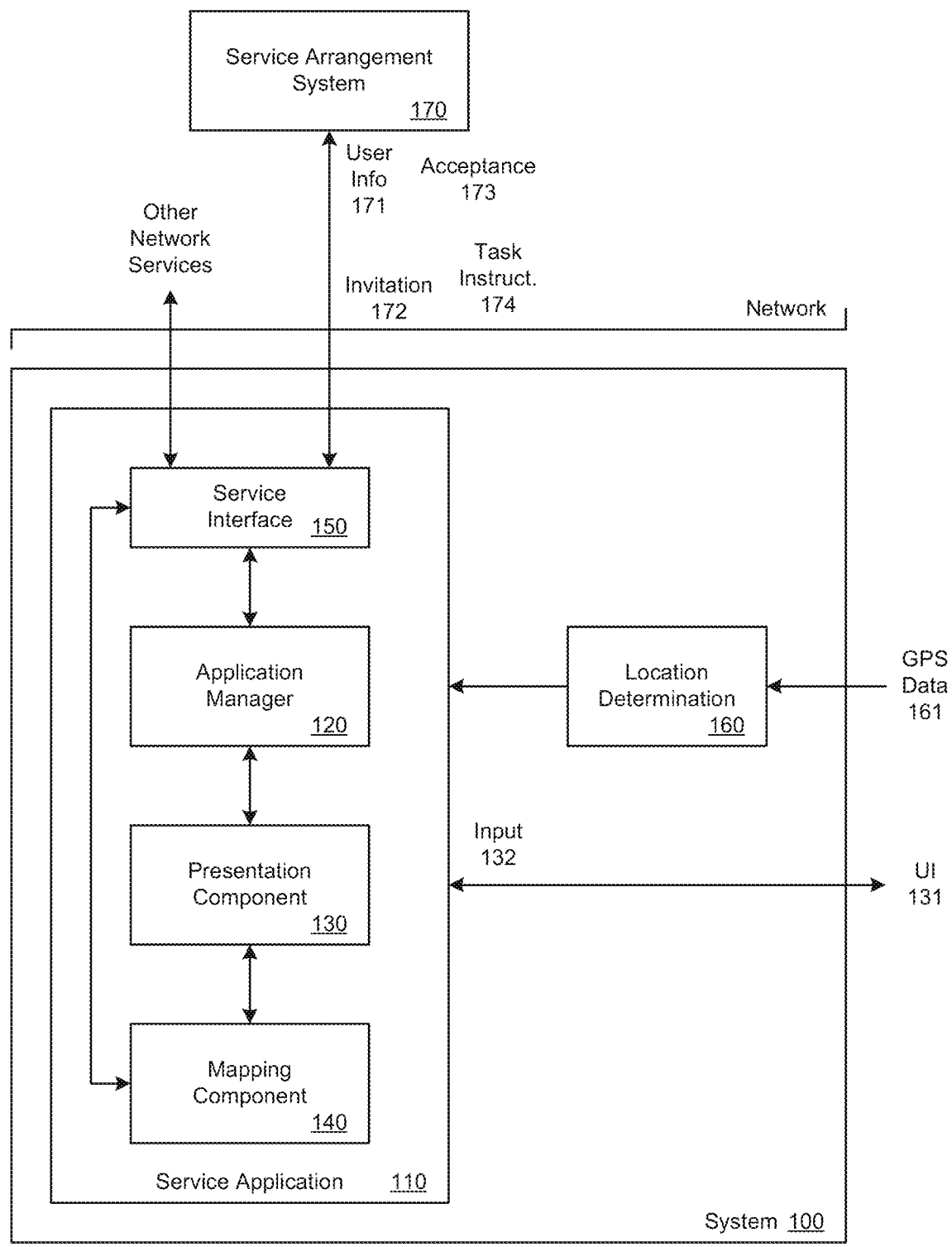
FIG. 1 illustrates an example system to provide information in connection with location-based services.

Examples described herein provide a system that displays information about one or more location-based services for purposes of assisting a user of a computing device to efficiently perform those services. The information that is displayed on the computing device can vary based on the user's current state or situation, such as, for example, the user's current location or what tasks have been completed by the user (and/or have not yet been completed by the user). Among other technical effects and benefits, examples include a system to dynamically alter the visual or graphical features of a user interface to display certain content in prominence for the user based on the user's current situation (as opposed to partially obscuring or hiding the content), so that information that is most pertinent to the user at that instance in time can be displayed on the computing device.

According to examples, the system can be implemented on a mobile computing device through use of at least a service application that can communicate with a service arrangement system (e.g., remote from the mobile computing device). As referred to herein, a service arrangement system can provide a network service in which requesters can make requests for services and services providers can be selected to provide those services. The service application can receive data in connection with a location-based service from the service arrangement system and can programmatically display information about the service on or as part of a user interface of the service application. For example, a task user interface can be displayed by the service application to instruct the user of the service application (e.g., a service provider) to go to a particular location and then to perform a particular task (e.g., "go here" and "do this"). The service application can dynamically display or fully expose a task panel on the task user interface to provide details about the task or to require an action(s) to be performed by the user depending on the user's current condition.

In one example, a service application operating on a mobile computing device can display a task user interface that includes a map and information about one of multiple tasks associated with one or more location-based services that the user of the mobile computing device has agreed to perform. The task user interface can provide content to guide the user to travel to a location associated with the task. As described herein, each location-based service can be associated with multiple tasks. For example, a delivery service of an object or a package from a first location to a second location can be associated with a first task, which corresponds to the user picking up the package at the first location, and can also be associated with a second task, which corresponds to the user dropping off the package at the second location. In another example, a task can include one or more sub-tasks that the user is to perform.

The service application can determine that the current location of the mobile computing device is within a threshold distance or a threshold estimated travel time from the location associated with the task. The current location can be determined using the global positioning system (GPS) component or receiver and/or other location-aware resources of the mobile computing device. In response to determining that the current location is within the threshold distance or the threshold estimated travel time, the service application can dynamically display, on the task user interface, a task panel that includes a first selectable feature that the user can select to indicate that the task has been completed. The task panel can be displayed in prominence by reducing the viewable size of the map on the task user interface and displaying the first selectable feature that was previously unexposed on the task user interface. If the user selects the first selectable feature to indicate that the task has been completed, the service application can dynamically display information corresponding to the subsequent task (e.g., a task associated with another service or a second task associated with the current service) on the task user interface, as arranged by the service arrangement system.

According to some examples, the service application can also provide a different mode of displaying information associated with one or more location-based services. For example, at a given time, the user may have agreed to provide multiple services for multiple requesters, e.g., transport a first rider and transport a second rider (such as one after the other or simultaneously for a duration of time). Each of the tasks associated with the multiple services can be arranged in a specified order by the service arrangement system to be performed by that user. The user can interact with the service application to view a schedule user interface that depicts, as graphic panels, information for each task that the user is to perform in the specified order. In addition, in some examples, each panel that is associated with a task can be individually selected in order for the user to view more detailed information about that task. In this manner, the user can view information about multiple tasks at once as opposed to viewing information about a particular single task on the task user interface.

Still further, in one example, the service application can receive invitation messages to provide location-based services from the service arrangement system, and based on the user's current condition and/or what user interface is currently displayed, can programmatically display different invitation user interfaces on the mobile computing device. For example, if the user is not currently providing a service, the service application can display an invitation user interface in a first format when an invitation message is received. In comparison, if the user is currently providing a service and/or if the task user interface is displayed, the service application can display an invitation user interface in a second format (such as an invitation panel that is displayed on the already displayed task user interface), which is different than the first format (e.g., a close to full screen user interface or much larger user interface than the invitation panel).

Among other benefits and technical effect, examples described herein promote targeted content presentation for service providers in connection with the operation of a network service. Because the amount of real estate of a display screen of a computing device, such as a smartphone, is limited in size, an application can be programmatically configured to display information received from the network service in an intelligent and efficient way. Rather than displaying as much information on the screen at one time, examples described herein utilize status information and/or location information in order to determine what content is to be displayed at what time, thereby providing clarity for the service provider. Still further, among other benefits, the system can provide content for display and for receiving user input in a manner that is clear and unobtrusive, so as to reduce the amount of time the user has to spend interacting with the device while driving, for example, thereby reducing distracted driving and improving safety for the user and the vehicle.

As used herein, a client device, a computing device, and/or a mobile computing device refer to devices corresponding to desktop computers, cellular devices or smartphones, personal digital assistants (PDAs), laptop computers, tablet devices, etc., that can provide network connectivity and processing resources for communicating with the service arrangement system over one or more networks. In another example, a computing device can correspond to an in-vehicle computing device, such as an on-board computer. Also, as described herein, a user, can correspond to a service provider (e.g., a driver of a vehicle) that has an account with the service arrangement system in order to receive invitations to provide location-based services for requesters (e.g., a merchant, a passenger).

Still further, examples described herein relate to a variety of location-based (and/or on-demand) services, such as a transport service, a food truck service, a delivery service, an entertainment service, etc., to be arranged between requesters and service providers. In other examples, the system can be implemented by any entity that provides goods or services for purchase through the use of computing devices and network(s). For purpose of simplicity, in examples described herein, the service arrangement system can correspond to a transport arrangement system that arranges transport and/or delivery services to be provided for requesters by drivers of vehicles who operate service applications on respective computing devices.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example system to provide information in connection with location-based services. According to an example of FIG. 1, the system 100 can be implemented by and operated on a computing device, such as a mobile computing device (e.g., a smartphone), through execution of instructions stored in one or more memory resources of the computing device. The system 100 can include a service application 110, a location determination component 160, and other components, which not illustrated for purpose of simplicity. For example, the system 100 can include a plurality of databases, other applications, other components for controlling and running the computing system, and a plurality of device interfaces to enable the system 100 to communicate with the hardware resources of the computing device. The components of the system 100 can combine to communicate with a service arrangement system 170 and dynamically display content on or as part of a user interface based on current conditions associated with the service application 110 and/or associated with the user of the computing device. Logic can be implemented with various applications (e.g., software) and/or with hardware of the computing device that implements the system 100.

As referred to herein, the service application 110 can correspond to a program (e.g., a set of instructions or code) that is downloaded and stored on the computing device. When running on the computing device, the service application 110 can communicate with a service arrangement system, such as the service arrangement system 170, over one or more networks (e.g., cellular network, wireless local area network), and/or other network services. The service arrangement system 170 can be implemented on network side resources, such as on one or more computing systems, servers, or data centers, and/or implemented through other computer systems in alternative architectures (e.g., peer-to-peer networks, etc.).

A user of the computing device can launch and operate the service application 110 in order to view content related to the network service and to receive invitations to provide location-based services from the service arrangement system 170. For example, the service arrangement system 170 can store a plurality of user accounts for service providers that have agreed to use the network service to receive invitations for providing services on behalf of requesting users. The service arrangement system 170 can store, in the user account for each service provider, information about that service provider (e.g., name, address, vehicle information, driver license information, insurance information, contact information, as well as information about the service application 110 and/or the computing device operated by that service provider (e.g., device identifier, device phone number, application version number, download date and/or time, etc.). When the user launches the service application 110 and/or provides input on the service application 110 to notify the service arrangement system 170 that the user is available to receive invitations (e.g., is capable of providing location-based services), the service arrangement system 170 can update the state of the user and/or the service application 110 as being on-duty and available, provided that the user's credentials are correct (e.g., user name and password) and associated with an existing user account.

According to examples, the service application 110 can periodically provide user information (e.g., a user identifier and/or state information) and/or location information of the user/computing device (referred to collectively as user info 171) to the service arrangement system 170. For example, the location determination component 160 can communicate with a Global Positioning System (GPS) receiver or component of the computing device or other wireless communication sub-systems, and receive or retrieve the GPS data 161 (a location data point, such as a latitude and longitude coordinate). The service application 110 can periodically determine the GPS data 161 corresponding to the current location of the computing device via the location determination component 160 and provide the location information to the service arrangement system 170.

Depending on the type(s) of service that the user has agreed or selected to provide (e.g., transport a passenger(s), deliver packages, etc.), when the user is available, the service arrangement system 170 can include that user in a pool of service providers to select from when requests for services are made by requesters. For example, the service arrangement system 170 can receive a request for a location-based service from a requester (e.g., that operates a respective computing device) and can arrange the location-based service by selecting a service provider from a plurality of available service providers to provide the location-based service for the requester. The selection can be based, at least in part, on location information provided by the requester (e.g., a pickup location and/or a destination location, etc.) and the current states (e.g., available or not) and locations of the service providers in a predetermined distance of the pickup location. The service arrangement system 170 can select an available service provider, such as the user of the system 100, and transmit an invitation to provide the location-based service for the requester, such as the invitation 172, to the service application 110.

In one example, the service application 110 can include an application manager 120, a presentation component 130, a mapping component 140, and a service interface 150. The service application 110 can also include other data, such as content to be displayed as user interface features for the service application 110, and other dynamic or static data associated with the user or the service application 110. For purpose of simplicity, other information and components of the service application 110 are not illustrated in FIG. 1.

According to an example, the application manager 120 can control the operation of the service application 110, including how to process information from the service arrangement system 170. The application manager 120 can also control the presentation component 130 to generate and display user interfaces for the service application 110 and/or can control the mapping component 140, which can display mapping content in conjunction with presentation component 130. The service interface 150 enables the service application 110 to exchange data between the service application 110 and the service arrangement system 170. For example, the service interface 150 can use one or more network resources of the computing device to exchange communications over one or more wireless networks (e.g., a cellular transceiver, a WLAN transceiver, etc.). The service interface 150 can include or use an application programming interface (API), such as an externally facing API, to communicate data with the service arrangement system 170. The externally facing API can provide access to the service arrangement system 170 via secure access channels over the network through any number of methods, such as web-based forms, programmatic access via restful APIs, Simple Object Access Protocol (SOAP), remote procedure call (RPC), scripting access, etc.

When the service application 110 receives an invitation 172 to provide a first service, the application manager 120 can instruct the presentation component 130 to generate an invitation user interface to be displayed on the display of the computing device (referred to collectively as user interface or UI 131 in FIG. 1), such as a touch-sensitive display device. The invitation user interface can include information about the first service, such as the type of service and location information associated with the first service (e.g., the pickup location of the passenger or the package, etc.), and information about the requester (e.g., the requester's name, a photo, the requester's rating, etc.). The invitation user interface can also be selectable or include a selectable feature that, when selected by the user, causes the service application 110 to transmit an acceptance message 173 to the service arrangement system 170 (e.g., the user agrees to provide the location-based service). According to some examples, based on the state of the user or the service application 110 (or based on what user interface is currently displayed), the presentation component 130 can display the invitation user interface in one of multiple visual formats. For example, the manner in which the presentation component 130 displays the invitation can be dependent on whether the user is currently providing a previously accepted service.

When the user accepts the invitation 172 by providing input 132 on the invitation user interface, the application manager 120 can provide, via the service interface 150, an acceptance message 173 to the service arrangement system 170. As an addition or an alternative, when the user accepts the invitation 173, the application manager 120 can cause the presentation component 130 to display content indicating that the service has been added (e.g., to the user's schedule or job list) as UI 131 for a brief predefined duration of time (e.g., one second, two seconds, etc.). The service arrangement system 170 can update the user's state as having accepted the invitation for the first service and/or as being on route to the pickup location of the first service, and also update the user's account or schedule with the first service. The schedule can also be updated locally at the service application 110, e.g., by the application manager 120 or by receiving information about the schedule from the service arrangement system 170. The service arrangement system 170 can also provide information about the accepted first service to the requester's computing device, so as to notify the requester about the user, the user's location, the user's estimated arrival time, etc., and can monitor the progress of the user via the received user info 171.

According to some examples, each location-based service can be associated with multiple tasks. As used herein, a task can correspond to an action (or sets of actions) that the user has to perform to provide and complete the associated service. When the user accepts the invitation 172 to provide the first service, the application manager 120 can cause the presentation component 130 to display UI 131 that provides information about the first task of the first service. In this example, the first service can correspond to a transport service for a requester. The first task can correspond to picking up the requester at the pickup location. Depending on implementation, the application manager 120 can determine information about the tasks from the invitation 172, can receive task instructions 174 from the service arrangement system 170 that specifies the tasks that the user is to perform in connection with the first service, or can receive task instructions 174 for tasks in order, one by one, when a previous task is indicated to be completed.

In one example, the presentation component 130 can display a task user interface that includes information about the first task, such as textual information about the first task, information about the first location associated with the first task (e.g., pickup location) and a map of a region that includes the first location and/or the current location of the user. The task user interface can continue to display information about a task, one after another, so long as there are tasks for services that the user has agreed to perform. For example, if the user has agreed to perform two services, the service arrangement system 170 may provide the service application 110 with four sets of task instructions 174 for four tasks (e.g., pick up the first passenger at the first location, drop off the first passenger at the second location, pick up the first package at the third location, drop off the first package at the fourth location).

In some examples, the task user interface can be designated into or can include sections or panels for displaying certain content, such as a first panel that provides information assisting the user about where to go (e.g., address, navigation, map), and a second panel that provides information assisting the user about what to do (e.g., tasks, details). The presentation component 130 can dynamically adjust the content on the task user interface by adjusting the visual characteristics of the panels in order to display information pertinent to the user based on the user's current condition and/or which task the user is to perform. From the time the user accepts the invitation 172 to the time the user approaches the pickup location associated with the first task, the focus of the task user interface is to provide information to enable the user to get to the pickup location.

The task user interface can include a map to assist the user to travel to a location associated with a task. The mapping component 140 can provide mapping content (e.g., map tile images, textual information associated with the map) to the presentation component 130 for display with the task user interface. Depending on implementation, the mapping component 140 can render mapping content using mapping data stored locally in the system 100 or service application 110, or can communicate, via a service interface 150 (or another service interface), with a network mapping service that provides mapping data to the mapping component 140. The mapping component 140 can also use the received GPS data 161 to display a graphic indicator on the mapping content corresponding to the current location of the computing device. For example, the map on the task user interface can include a first graphic indicator corresponding to the pickup location (of the first task) and a second graphic indicator corresponding to the current location of the computing device or user.

Still further, in one example, the mapping component 140 and the presentation component 130 can communicate with the network mapping service and/or the service arrangement system 170 to display, on the mapping content, a graphic route line(s) representing the determined route the user is to take from the current location to the location associated with the task, as well as to provide turn-by-turn directions in a navigation mode. The user can select a feature, such as "Navigate," on the task user interface to change modes from an overview mapping mode (e.g., looking down from the sky) to a navigation mode. The route from the current location of the user to a location associated with a task can be determined by the network mapping service or a routing engine implemented by the service arrangement system 170. Alternatively, the system 100 can determine the route using other resources.

Referring back to the example of the first service, after the user accepts the invitation 172 for the first service, the task user interface can display information about the first task of the first service (e.g., pick up the requester at the pickup location). As the user travels to the pickup location, the presentation component 130 and/or the mapping component 140 can update the user's position and/or the graphic route lines on the map accordingly. When the user is close to a location associated with a task, the service application 110 can cause different content to be displayed on the task user interface. For example, the application manager 120 can determine when the current location of the computing device is within a threshold distance or a threshold estimated travel time from the pickup location of the first task. When the application manager 120 determines that the current location is within the threshold distance or the threshold estimated travel time from the pickup location, the application manager 120 can cause the presentation component 130 to dynamically alter the content of the task user interface by displaying, or making more prevalent or prominent, information about the task or action the user is to perform. For example, the presentation component 130 can dynamically reduce the size of the first panel that provides information to assist the user where to go (e.g., reduce the size of the map), and display or increase the size of the second panel that provides information to assist the user about what needs to be done.

According to examples, the application manager 120 can determine that the current location of the computing device is within a threshold distance or a threshold estimated travel time from a location associated with a task by computing a distance from the current location to this location and comparing that distance to the threshold distance, or by periodically computing an estimated travel time from the current location to this location and comparing that estimated travel time to the threshold estimated travel time, respectively. Alternatively, the application manager 120 can determine that the current location of the computing device is within a threshold distance or a threshold estimated travel time from a location associated with a task by receiving, from the service arrangement system 170, information indicating that this event has occurred. The service arrangement system 170 can perform the computations and comparisons, such as described, using the location information periodically received from the service application 110 during the monitoring of the user or the progress of the service.

When the information about the task is displayed to be more prominent than before on the task user interface, other information or features can be shown that was previously unexposed. For example, the second panel, e.g., the task panel, can include a selectable feature (that was previously unexposed or not displayed on the task user interface), which the user can select to indicate that the first task has been completed. If the user selects the first selectable feature by providing user input 132, the application manager 120 can determine that the first task has been completed (e.g., the requester has been picked up) and can determine the next task that the user has to perform. Depending on implementation, based on the services the user has agreed to perform, the subsequent task can be a task associated with the first service (e.g., drop off the requester) or can be a task associated with another service, e.g., a second service, that the user has agreed to perform (e.g., pick up a second requester). For example, the user can pick up the first requester, then be instructed to pick up a second requester at a specified pick up location, then be instructed to drop off the first requester and then the second requester, or be instructed to drop off the second requester and then the first requester. The order or sequence of the tasks to be performed can be determined by the service arrangement system 170 based on efficiency (e.g., shortest distance to travel or overall estimated travel time for the user to perform the services).

In this manner, the system 100 can enable the computing device to display instructions for a user in a concise and effective manner based on the user's current condition, e.g., the user's current location or what task is currently to be performed by the user. The system 100 can provide information that is most relevant to the user at the time in prominence and dynamically adjust the content when necessary. The user can continue to receive invitations for services even when the user is currently in the process of providing previously accepted services and the user interfaces 131 can continue to display information to instruct the user to "go here," "do this," "go here," "do this," repeatedly.

Methodology

Figure 2:
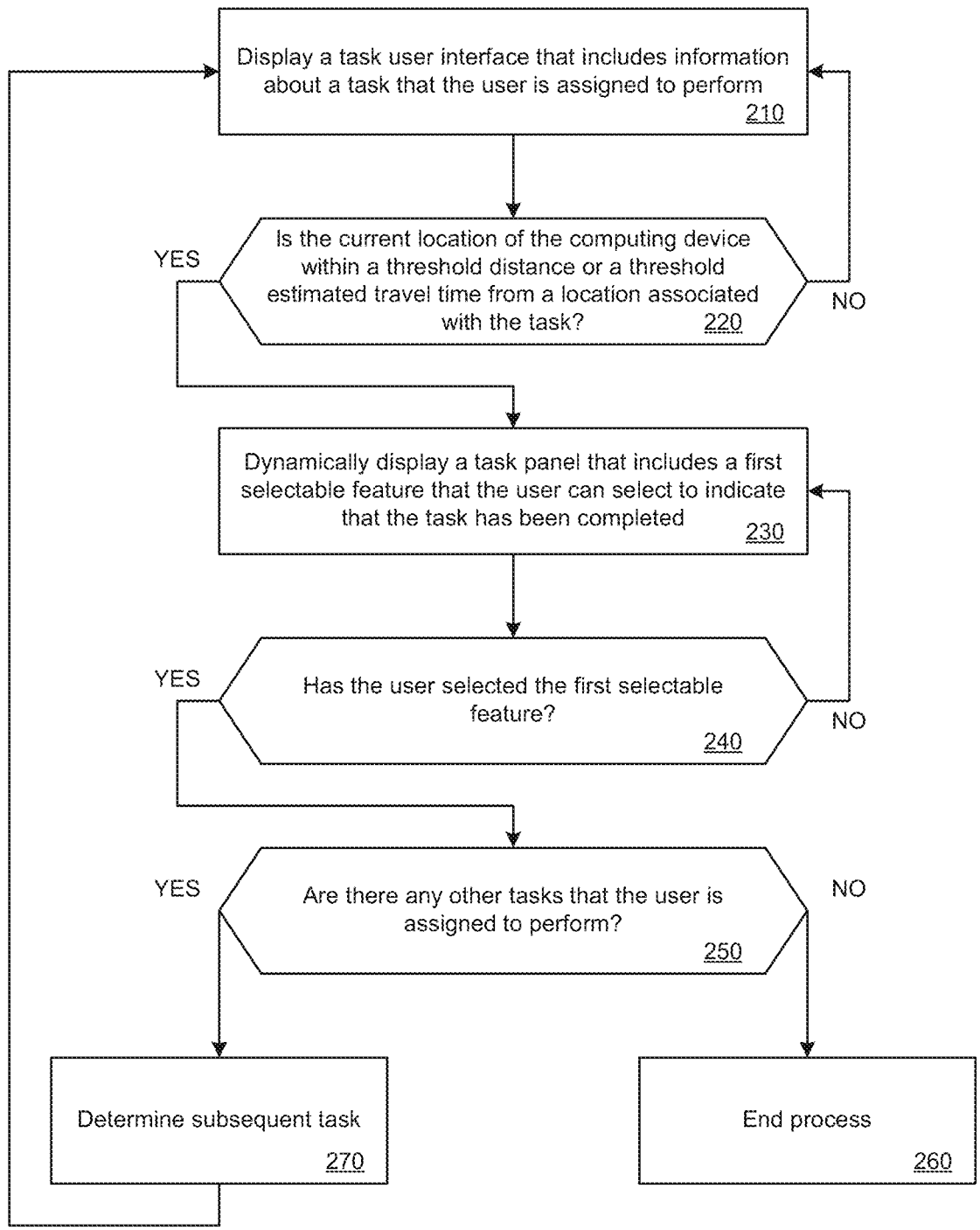
FIG. 2 illustrates an example method for providing information in connection with location-based services.
Figure 3:
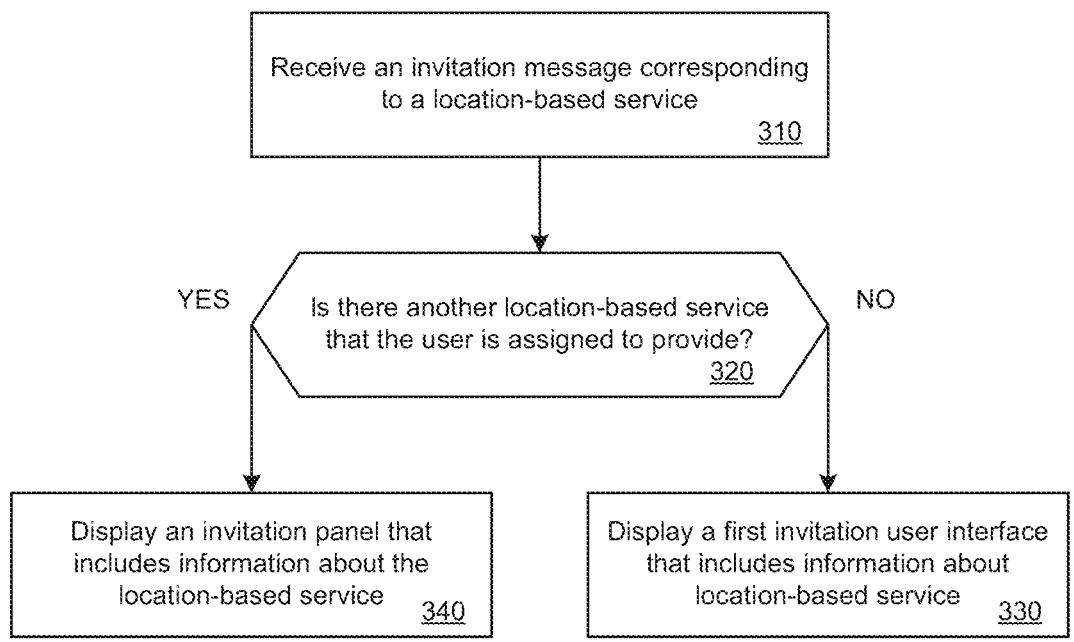
FIG. 3 illustrates an example method for controlling the presentation of information of a user interface.

FIG. 2 illustrates an example method for providing information in connection with location-based services. FIG. 3 illustrates an example method for controlling the presentation of information of a user interface. The methods such as described by examples of FIGS. 2 and 3 can be implemented using, for example, components described with the example of FIG. 1. Accordingly, references made to elements of FIG. 1 are for purposes of illustrating a suitable element or component for performing a step or sub-step being described.

Referring to FIG. 2, the service application 110 can communicate with the service arrangement system 170 to receive invitations for services that a user of the service application 110 is authorized to provide. Provided that the user has accepted an invitation to provide a location-based service, e.g., a first service, the service application 110 can display a task user interface that includes information about a first task of the first service that the user is to perform (210). For example, the first task can correspond to picking up a package at an associated location, e.g., a first location. The task user interface can include (i) what the task is, (ii) location information where the task is to be performed, e.g., the pickup location as an address, a landmark, a street intersection, etc., (iii) map content associated with the location information or the current location of the computing device, and/or (iv) other selectable features for viewing other content, such as a menu feature or navigate feature.

The service application 110 can determine when the current location of the computing device is within a threshold distance (e.g., 500 meters) or a threshold estimated travel time (e.g., 30 seconds, or 1 minutes) from the location associated with the first task (220). For example, as the user travels to the location associated with the first task, the service application 110 can periodically perform a check to determine whether the computing device is within the threshold distance or threshold estimated travel time. The service application 110 can periodically determine the GPS data 161 corresponding to the current location (e.g., a latitude and longitude coordinate), compute the distance or estimated travel time (e.g., using an estimated or planned route determined using the mapping service or routing engine) to the location associated with the first task, and check the determined value with the respective threshold value. Alternatively, the service application 110 can receive an event trigger notification from the service arrangement system 170 when the service arrangement system 170 determines that the computing device is within the threshold distance or threshold estimated travel time. According to examples, an administrative user of the service arrangement system 170 can configure or specify the threshold distance or estimated travel time. These thresholds can be transmitted to the service application 110 in examples where the service application 110 performs the computations and comparisons.

When the service application 110 determines that the computing device is close to the location associated with the task (e.g., is within the specified threshold value), the service application 110 can dynamically alter the content of the task user interface in order to display additional content or features that were previously not displayed (230). The additional content can highlight an action that needs to be performed by the user now that the user is close to or at the location associated with the task. In one example, a task panel that was previously not displayed, or that was minimized or at least partially occluded, can be more prominently displayed on the task user interface. The task panel can include a selectable feature that the user can select or swipe (e.g., provide an input gesture) to indicate that the task has been completed. The feature can include textual content, such as "Complete Pickup," corresponding to the task.

The service application 110 can determine if the user has selected the selectable feature (240). If the user does not select the selectable feature, the service application 110 can continue to display the task panel until the selectable feature is selected by the user. According to one example, the service application 110 can determine if the user has been stationary or been within the threshold value of the location associated with the task for a predetermined duration of time (e.g., three minutes) and/or if the task panel has been displayed without receiving user input for a predetermined duration of time. In such an example, after the duration of time, the service application 110 can dynamically display additional content to instruct the user what to do. For example, a notification can be displayed that tells the user to contact the requester and displays selectable features for texting or calling the requester.

On the other hand, when the service application 110 detects that the user has provided input to select the selectable feature on the task panel, the service application 110 can determine if there are other tasks that the user is assigned to perform (250). Referring to the example, the first service can correspond to a package delivery service from the pickup location to a destination location, and the first task that the user is to perform can correspond to picking up the package at the pickup location. When the user arrives at the pickup location, and picks up the package, the user can provide user input 132 to select the selectable feature to indicate that the package has been picked up (e.g., the task has been completed). The service application 110 can determine that there is a next task for the user to complete, which is to drop off the package at the destination location, e.g., the subsequent task, as specified by the service arrangement system 170 (270). In response, the service application 110 can then display information about the second, subsequent task on the task user interface, with the task panel again reverting back to the previous state (e.g., hidden state or partially unexposed state) (back to 210). The service application 110 can then again determine when the computing device is close to or has arrived at the location associated with this second task, e.g., the destination location.

If the completed task is the last task that the user has agreed to perform (e.g., there are no other subsequent tasks or services that the user has to perform in the user's schedule), then the process can end (260). When the process ends, the service application 110 can display a home screen interface as opposed to the task user interface, and be in an on-duty and available state. The home screen interface can show map content corresponding to a region that the user is currently located in. At this point, the service application 110 can be in this state until another invitation for service is received from the service arrangement system 170, or until the user goes offline or off-duty (or closes the service application 110). If the service application 110 receives an invitation and the user accepts it, the service application 110 can then again display the task user interface (repeat from step 210).

While the example of FIG. 2 describes the operation of the service application 110 in displaying content for providing services that the user has previously accepted, FIG. 3 illustrates an example method for controlling the presentation of information of a user interface when invitations for providing services are received. Accordingly, in some examples, one or more of the steps of the example method of FIG. 3 can be performed concurrently with the example method of FIG. 2.

According to some examples, the service arrangement system 170 can arrange multiple services to be performed by a user. Depending on implementation, the user can be assigned to provide a first service and then a second service, or perform at least portions of the first service and the second service concurrently (e.g., for at least a duration of time). In other variations, the user can be assigned to provide three or more services in sequence and/or three or more services concurrently. Regardless of whether the user has not been assigned to provide a service, or is already providing a service or has been arranged to provide the service, the service arrangement system 170 can transmit an invitation message corresponding to a location-based service to the service application 110. For example, when the service arrangement system 170 receives a request for a location-based service, the service arrangement system 170 can select the user to provide the service, provided that the user is a capable candidate to provide the location-based service (e.g., satisfies the selection criteria).

In one example, when the service application 110 receives an invitation message corresponding to a location-based service (310), the service application 110 can determine whether there is another location-based service that the user is already assigned to perform (320). The service application can determine its operation state (e.g., not yet providing service, performing a task for a service, or more specifically, is on route to the pickup location or has already picked up the passenger or package, etc.) or can determine if there are any tasks in the user's schedule or job list. As an addition or an alternative, the service application 110 can determine whether the task user interface is being displayed on the computing device (e.g., as opposed to a home user interface of the service application 110). If the task user interface is being displayed, it can be indicative that a task is to be performed, and thus, that a service is already assigned to the user.

If there is no other service that is currently assigned to the user, the service application 110 can use the invitation message about a location-based service to display a first invitation user interface that includes information about the location-based service (330). The first invitation user interface can be in a first format, such as a full screen user interface or a close to full screen user interface that is displayed on the computing device. The first invitation user interface can include map content showing a graphic representation of the pickup location of the location-based service as well as information about the type of service, location information, requester information (e.g., name, photo, rating, etc.), and/or estimated travel time information to the pickup location. The service application 110 can display the first invitation user interface in this first format as the user does not have to view content for other services (as the user is not currently assigned to provide other services).

On the other hand, if the user is already providing a service (or is assigned to provide a service) when the invitation message is received, the service application can display a second invitation user interface in a second format (340). According to an example, the second invitation user interface can correspond to an invitation panel that is displayed along with or as part of the already displayed task user interface (because the user is currently assigned to a previous service). This invitation panel can be structured in the second format that is different than the first format (e.g., the invitation panel can be much smaller than the first invitation user interface). In this manner, when the invitation message is received, the user can continue to view content about the previously assigned service and/or task the user is to perform. The invitation would not obstruct information that assists the user to provide the previously assigned service and/or task.

As an addition or an alternative, the service arrangement system 170 can control the manner in which the invitation message is displayed by the service application 110. The service arrangement system 170 can know the state of each service application 110 and/or the user of that application. Depending on whether the selected user is providing service or is assigned to provide service, the service arrangement system 170 can transmit the invitation message for a new service with respective format instructions to the service application 110. The format instructions can cause the service application 110 to either display the invitation as a first invitation user interface or as an invitation panel, depending on whether the user is assigned to provide a previous service.

USE CASE EXAMPLES

FIGS. 4A through 4K illustrate examples of user interfaces displayed on a computing device. FIGS. 5A and 5B illustrate examples of a schedule user interface displayed on a computing device. The user interface examples in FIGS. 4A through 5B are used to describe the interactive operation of the service application for illustrative purposes. Other graphics or content may be included or removed from individual examples of FIGS. 4A through 5B depending on various implementations.

For purpose of simplicity, the examples of FIGS. 4A through 4K are described with respect to a user (a service provider) that is operating a service application to receive information from a service arrangement system. The user has launched the service application on his or her computing device and has provided input to indicate to the service arrangement system that he or she is on-duty is available to provide location-based services. Once the user goes on-duty, the service application can display a home user interface that can include the user's name, the user's star rating (e.g., a value between zero and five), a map of the geographic region the user and the computing device is located in, and a graphic representation of the user's current location on the map (e.g., an image of a vehicle).

Figure 4A:
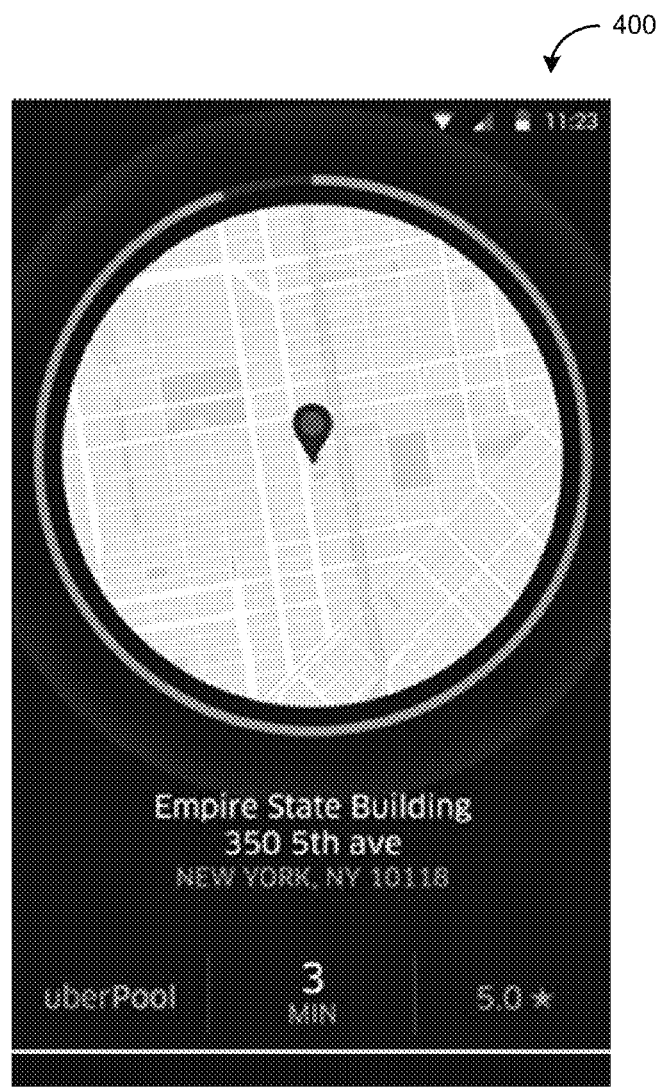
FIGS. 4A through 4K illustrate examples of user interfaces displayed on a computing device.
Figure 5A:
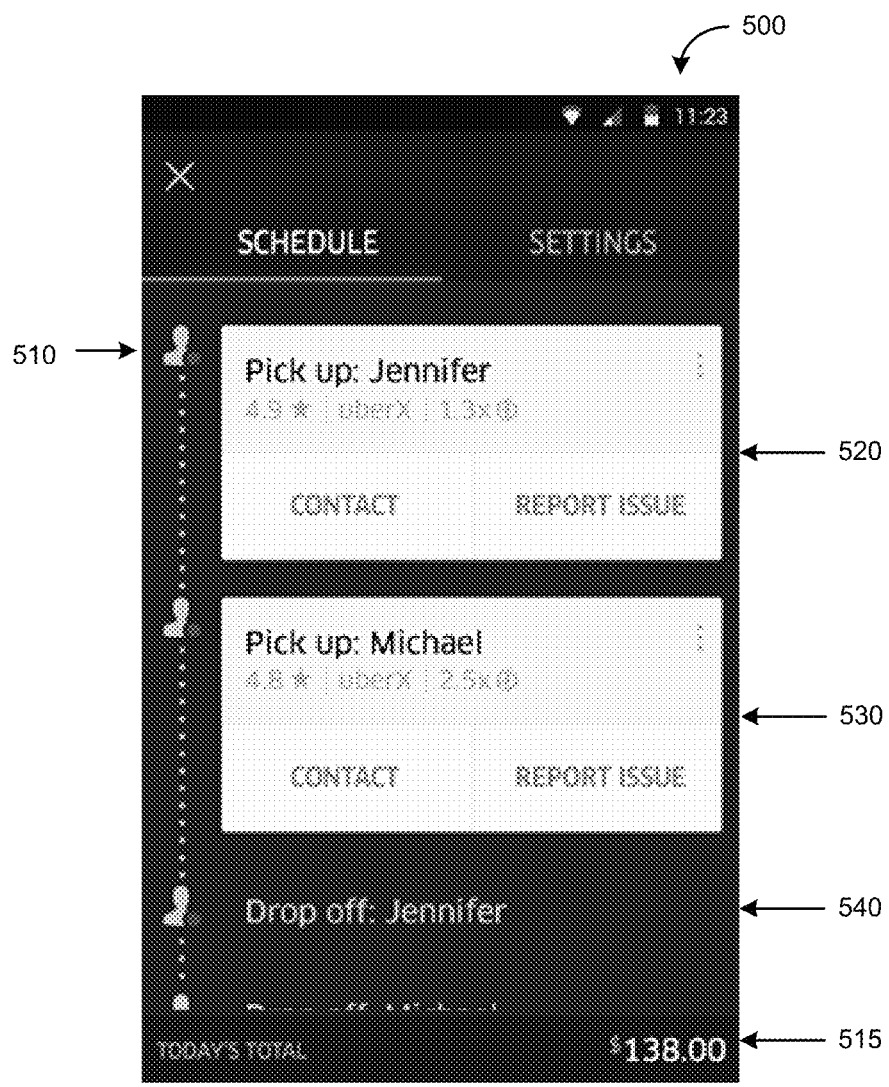
FIGS. 5A and 5B illustrate examples of a schedule user interface displayed on a computing device.
Figure 5B:
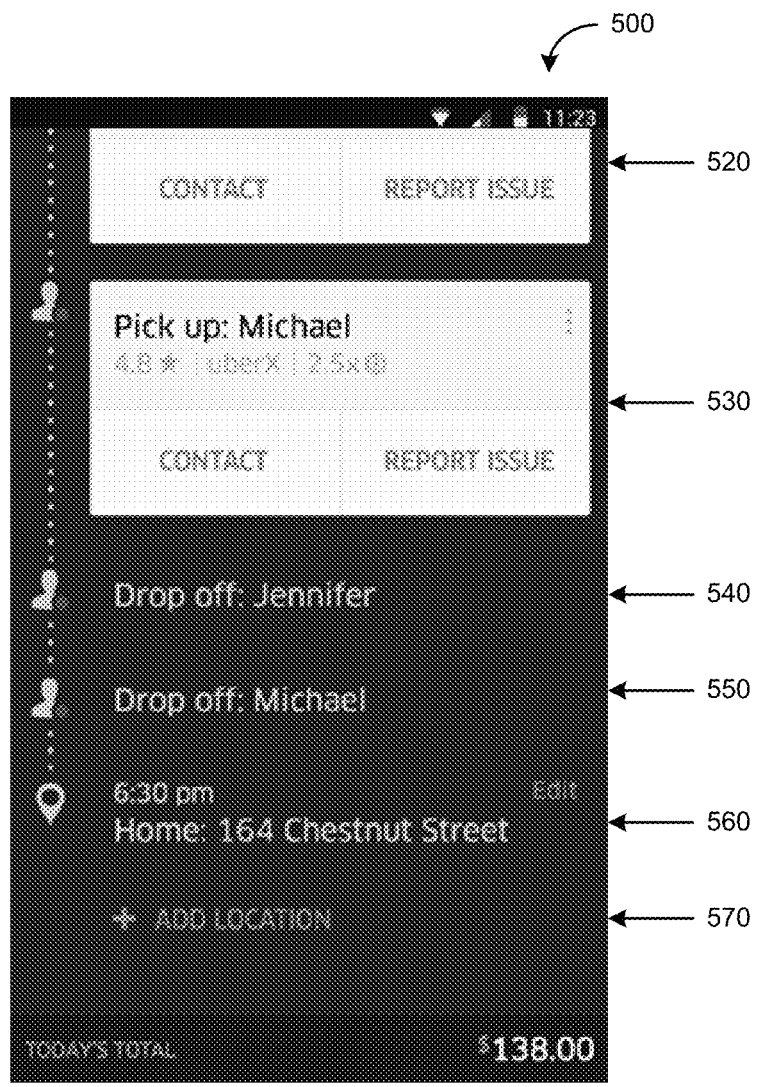

FIG. 4A illustrates a first invitation user interface 400 that is displayed by the service application when an invitation to provide a service (e.g., first service) is received from the service arrangement system. The first invitation user interface 400 can be displayed when the user has not yet been assigned or has not yet agreed to provide a service. For example, the first invitation the service application receives after the user goes on-duty can be displayed as the first user interface 400. The first invitation user interface 400 can include information about the first service type (e.g., uberPool, which corresponds to transporting one or more people individually or concurrently), the pickup location of the requester, the estimated travel time to the pickup location, the rating of the user, map content, an indicator on the map representing the pickup location, and a visual indicator (surrounding the map content) representing a timer that reduces in size as a duration of time the user has to accept the invitation decreases (e.g., a countdown of ten seconds or twenty seconds). The majority (e.g., the map portion) or the entirety of the first invitation user interface 400 can be selectable, so that the user can easily touch the first invitation user interface 400 at mostly any location to accept the invitation. If the user does not want to accept the invitation, the user can simply let the time to accept expire.

Figure 4B:
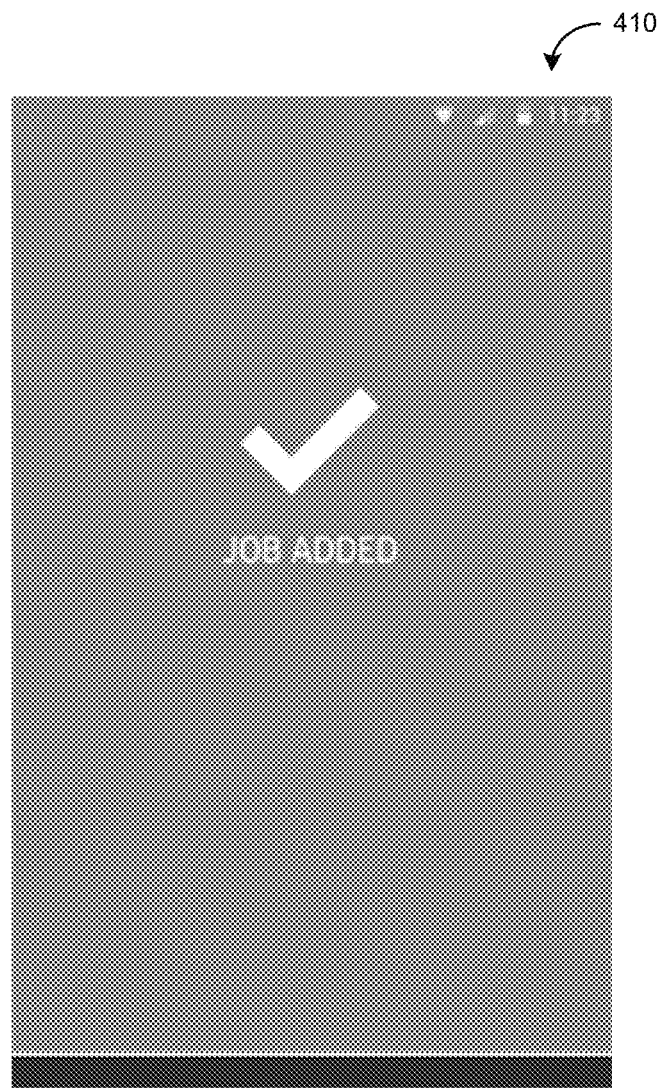
Figure 4C:
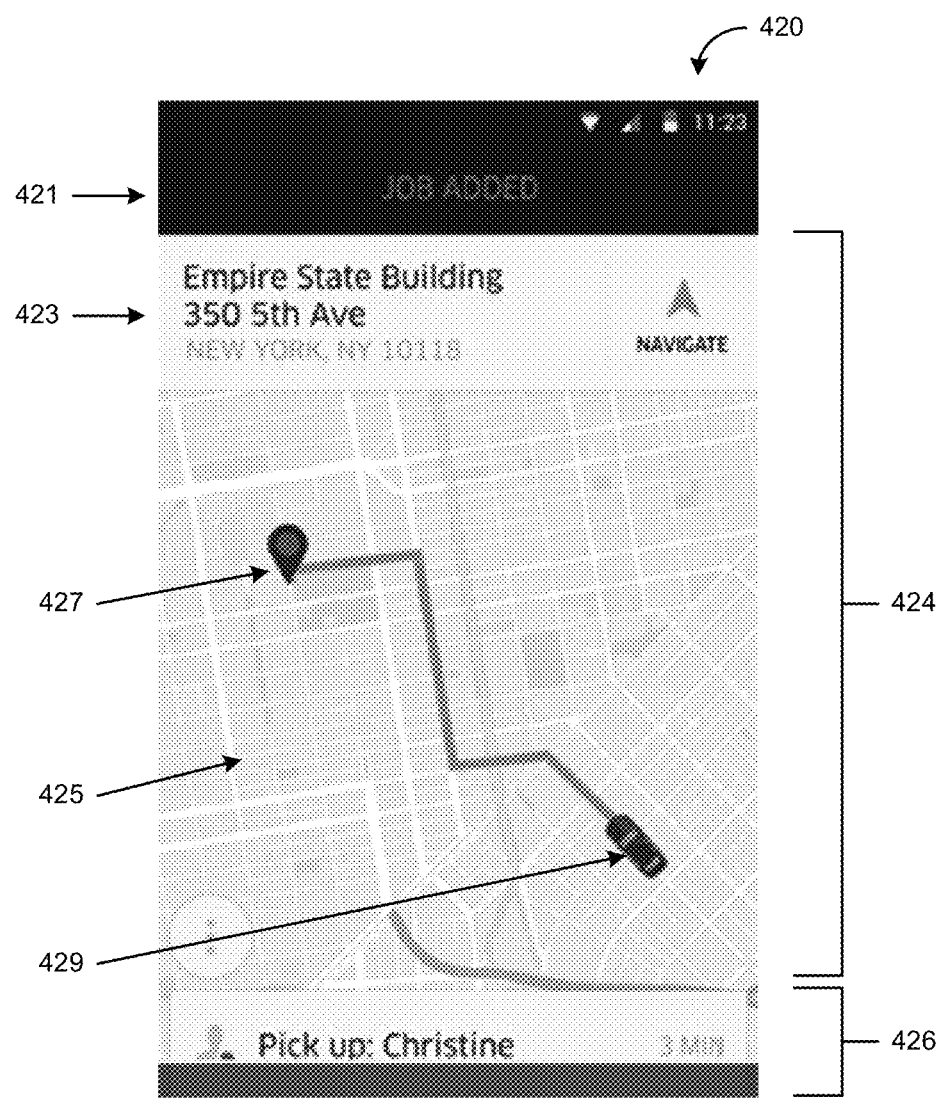
Figure 4D:
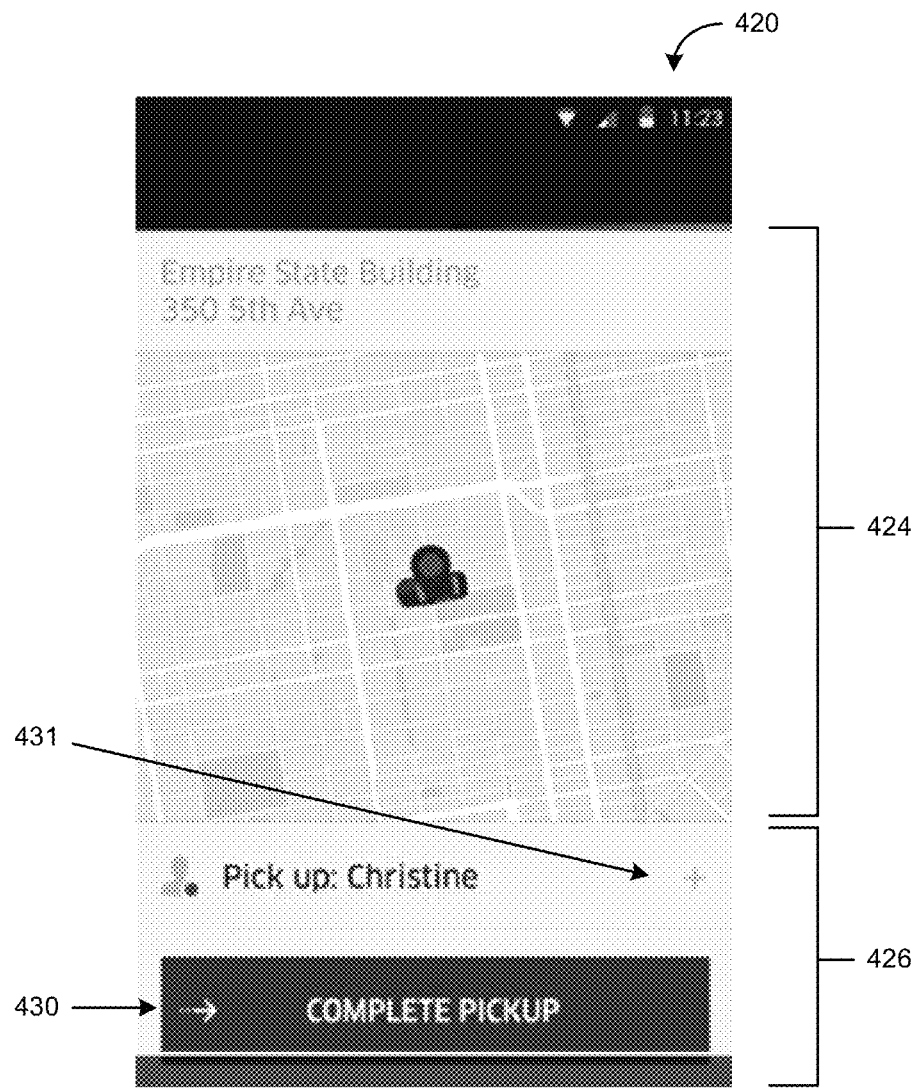

According to an example, in response to the user accepting the invitation, the service application can display content 410 indicating that the service has been accepted and/or added to the user's schedule or job list, such as illustrated in FIG. 4B. This content 410 can be displayed dynamically to capture the user's attention for a brief period of time, such as the check mark, for example, being dynamically drawn on the screen. In addition, the content 410 can be displayed for a predetermined duration of time (e.g., two seconds, three seconds), so that after the duration of time elapses, the user interface automatically transitions to a task user interface 420, such as illustrated in FIG. 4C. In one example, the content 410 can dynamically transition upward to the section 421 of the task user interface 420 and the "Job added" text can fade out, while the service application name or logo fades in.

The task user interface 420 can include content corresponding to the first task of the first service the user is to perform. In this example, the first service can correspond to transporting a passenger (Christine) from a pickup location (e.g., the Empire State Building at 350 5$^{th}$ Ave., NYC) to a destination location. Accordingly, the first task can correspond to picking up the passenger ("Pick up: Christine"). According to examples, the task user interface 420 can be defined or designated primarily into a first panel or segment 424 and a second panel or segment 426. The first panel 424, or the "Go Panel," can include location information associated with the task, such as the address 423 (or name of the point of interest, if any), map content 425 of the geographic region associated with to the current location of the user and/or the pickup location, and/or a "Navigate" feature to change modes from the route view mode (the current view in FIG. 4C) to a turn-by-turn navigation mode. The map content 425 can include an indicator 427 corresponding to the location associated with the task (e.g., the pickup location) and an indicator 429 corresponding to the current location of the user. The map content 425 can also include the route from the current location to the pickup location, shown as a set of graphic route lines. As the user travels to the location associated with the task, the indicator 429 can move accordingly on the map content 425 and/or the route line(s) can be adjusted and shrunk accordingly.

The second panel 426, or the "Do Panel" (also referred to herein as the task panel), can include content corresponding to the task the user is to perform in connection with the service. In the example of FIG. 4C, the first task is to "Pick up: Christine." The second panel 426 can also include an estimated travel time for the user to get to the pickup location. This estimated travel time (e.g., 3 minutes) can dynamically change as the driver travels to the pickup location. In FIG. 4C, because the user has not yet arrived to the pickup location, the focus of the task user interface 420 can be to display information to assist the user to travel to the appropriate location. Accordingly, the second panel 426 is shown as being reduced in size in the example of FIG. 4C (whereas in other examples, the second panel 426 may not be displayed on the task user interface 420 at all).

When the service application determines that the user is close to the location associated with the task, e.g., the pickup location in this example, or has arrived at the pickup location, the service application can dynamically transition the task user interface to display the second panel in more prominence. For example, in FIG. 4D, the task user interface 420 depicts the second panel 426 having been exposed or displayed in prominence (as compared to before, in FIG. 4C). The second panel 426 can include a selectable feature 430, e.g., with the text "Complete Pickup," corresponding to the task, which the user can select in order to indicate to the service arrangement system that the task has been completed (e.g., that Christine has been picked up). The second panel 426 can also include another selectable feature 431 that, when selected by the user, can display additional content or features in connection with the task. In some examples, the estimated travel time indicator can dynamically change to the selectable feature 431 when the service application determines that the user is close to the pickup location or has arrived at the pickup location.

Figure 4E:
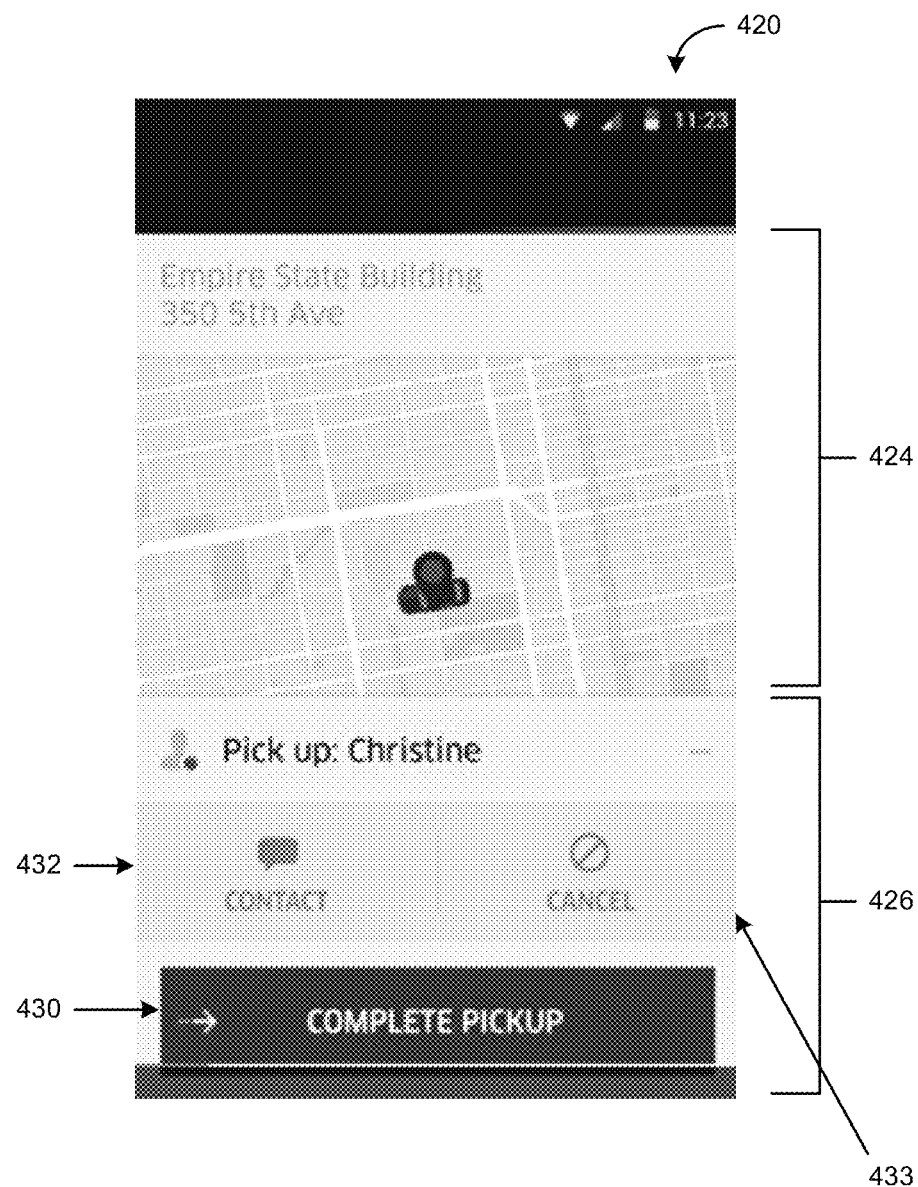

FIG. 4E illustrates an example of the task user interface 420 when the user selects the selectable feature 431 to view additional content or options in connection with the task. For example, the second panel 426 can be expanded even more to display a plurality of other selectable features, such as the contact feature 432 and the cancel feature 433. When the user selects the contact feature 432, additional options can be displayed in which the user can either call or message the requester. On the other hand, when the user selects the cancel feature 433, the service application can determine that the user wants to cancel providing the service and can notify the service arrangement system accordingly.

Figure 4F:
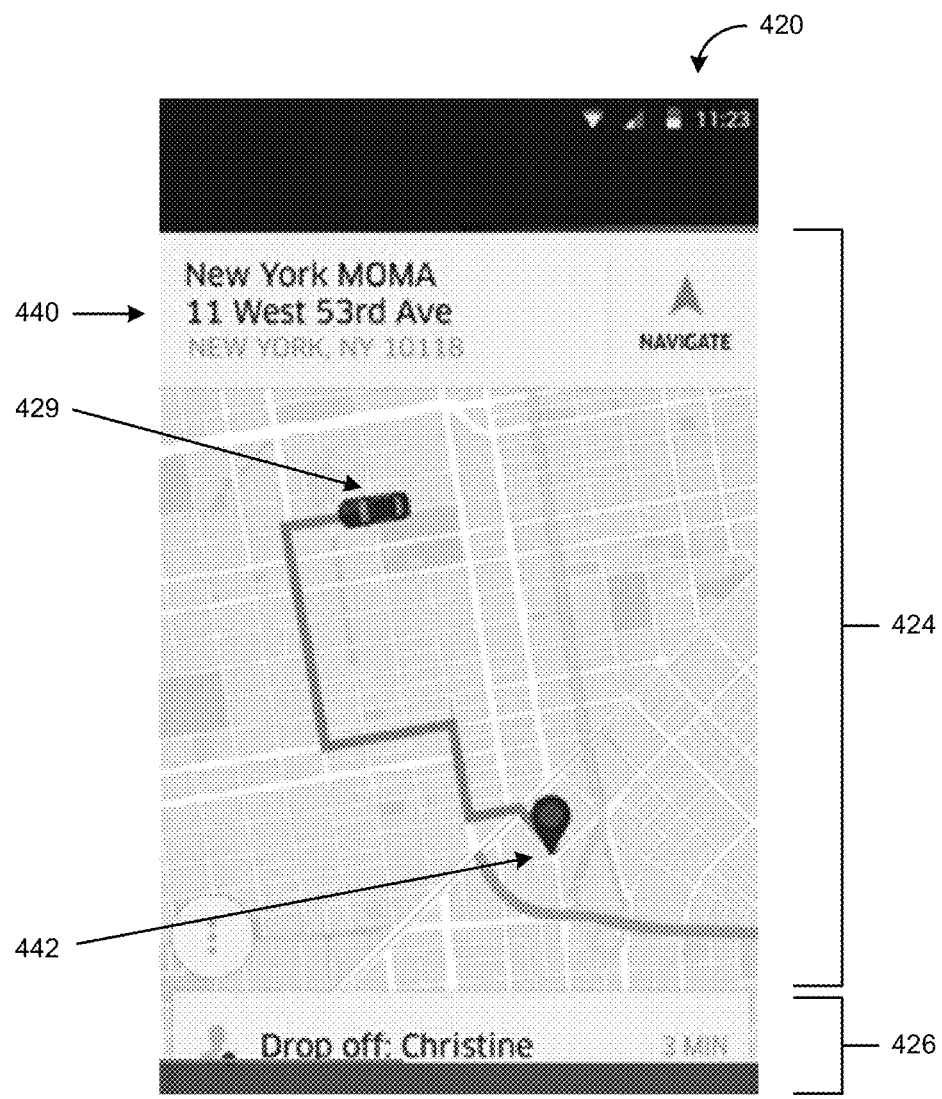
Figure 4G:

When the user selects the selectable feature 430 to indicate that the task has been completed, e.g., the user has picked up Christine, the service application can transition the task user interface 420 to display information about the subsequent task that the user has to perform (e.g., the second task). According to the example of FIG. 4F, the next task corresponds to dropping off the requester at a second location, e.g., the destination location (e.g., New York MOMA at 11 West 53rd Avenue). The destination location may have been inputted by the requester or inputted by the user. Again, the map content 425 can provide information to assist the user to get to the second location associated with the second task, and can include an indicator 442 corresponding to this second location. When the user gets close to the second location, the service application can transition the task user interface 420 to again display, in prominence, the second panel 426, such as illustrated in FIG. 4G.

In one example, the task panels can display different content based on what the tasks are. In FIG. 4G, the second panel 426 can include other features than just a selectable feature to indicate completion of the task, such as a set of rating features 450. For example, the second panel 426 in FIG. 4G may require that the user provide a rating or score for the passenger by selecting one of five stars before indicating completion of the task. The "complete drop off" feature may be highlighted and selectable only after the user inputs a rating.

Figure 4H:
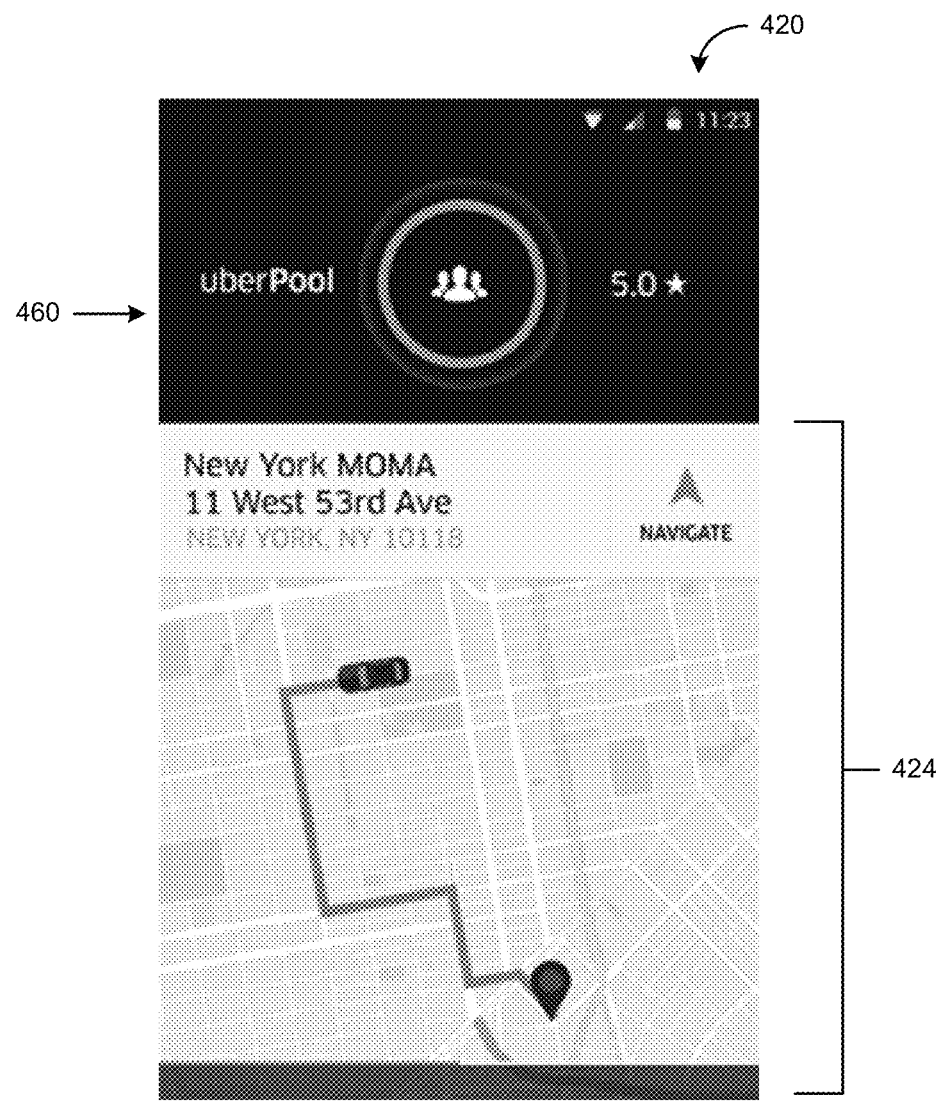

According to some examples, the service application can receive an invitation message for a location-based service from the service arrangement system while the user is currently providing a previously assigned/accepted service. As described with respect to FIG. 4A, if the user is not providing a service or has not been assigned to provide a service, when the invitation message is received, the service application can display the first invitation user interface 400 of FIG. 4A. On the other hand, if the user is currently assigned to or is currently providing a service (e.g., transport Christine), the task user interface 420 can be displayed, such as illustrated in FIG. 4F. At this time, when the service application receives an invitation message for a second service, the service application can display an invitation panel on or as part of the task user interface, such as illustrated in FIG. 4H. The task user interface 420 in FIG. 4H can continue to display at least a portion of the first panel 424, while concurrently displaying the invitation panel 460 corresponding to the invitation of the second service. The invitation panel 460 can be selectable, similar to the first invitation user interface, but displayed in a smaller format than the first invitation user interface so as to not interfere with the location instructions to guide the user to the location associated with the ongoing task (e.g., the second task of the first service). In addition, the task user interface 420 can hide the second panel 426 in FIG. 4H as the user does not need to view the second panel at this point in time.

Figure 4I:

When the user provides input by selecting an area of the touch-sensitive display corresponding to the invitation panel 460 to accept the invitation, the service application can display content 465 indicating that the invitation has been accepted, such as illustrated in FIG. 4I. The content 465 can indicate that the second service has been added to the user's schedule and can dynamically display graphics or text to capture the user's attention for a short duration of time (e.g., similar to the content described in FIG. 4B). The content 465 can be dynamically phased out or removed from the display after a duration of time (e.g., two seconds).

Depending on implementation, the service arrangement system can change the order or specify the order in which the user is to perform the task(s) associated with first and second services. For example, if the service arrangement system determines that the user is to continue to perform the second task of the first service (e.g., drop off Christine), the service application can be instructed to display the task user interface as described in FIG. 4F. In such an example, the service application can alter the task user interface 420 to remove the content 465 of FIG. 4I to display the task user interface 420 of FIG. 4F. On the other hand, if the service arrangement system determines that the user should now perform the first task of the second service (e.g., pick up the second requester) as opposed to continuing to perform the second task of the first service, the service application can be instructed to display, in the task user interface 420, information about the first task of the second service, such as illustrated in FIG. 4J.

Figure 4J:
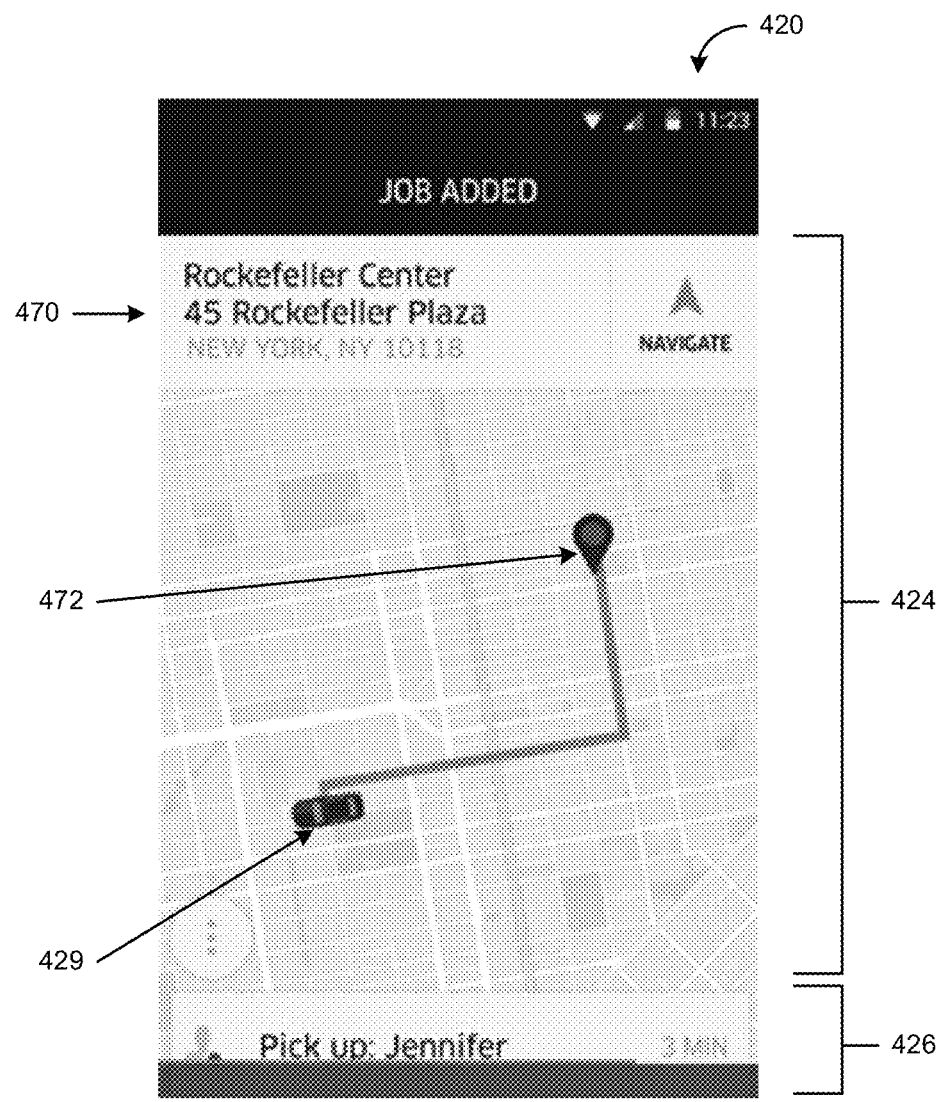

As shown in FIG. 4J, the task user interface 420 displays content instructing the user to go to the location associated with the first task of the second service, e.g., the pickup location of Jennifer at Rockefeller Center at 45 Rockefeller Plaza. Again, the task user interface 420 can include the first panel 424 that shows the location indicator 476, and map content that includes an indicator 472 of the pickup location, an indicator 429 of the current location of the user, and graphic route line(s). The second panel 426 can include content about the first task of the second service, e.g., "Pick up: Jennifer." Again, if the user gets close to or arrives at the location associated with this first task, the second panel 426 can be displayed in prominence and expose additional features on the task user interface 420. In this manner, the service application can use the user's current condition (e.g., status information and/or location information) in order to determine what content is to be displayed at what time, rather than displaying as much information on the screen at one time. Accordingly, information about a task and/or sub-tasks are displayed for the user when it is time for the user to perform the task after having traveled to the appropriate location.

Figure 4K:
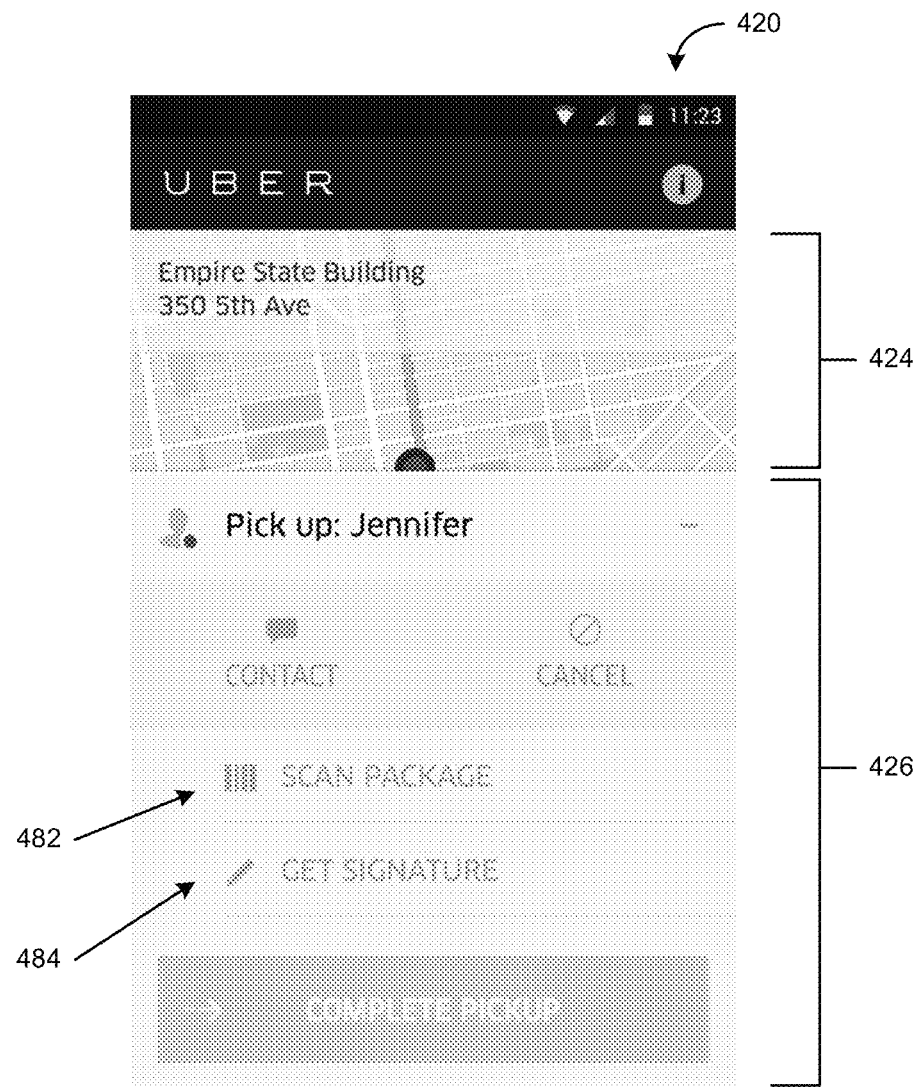

As an addition or an alternative, when a location-based service corresponds to a delivery service of a package, the task panel can display additional information that is pertinent to such a service. Referring to FIG. 4K, for a delivery service of a package, the second panel 426 can include sub-tasks that the user is to perform in order to complete the task. For example, the second panel 426 can include a "scan package" feature 482 that the user can select to scan the package the user picked up. When the users selects the feature 482, in one example, the service application can display an interactive user interface to enable the user to operate the camera or bar code reader of the computing device (or wirelessly connected peripheral device) to scan an identifier or barcode of the package. This can provide confirmation that the correct package has been picked up and that the package itself is in possession by the user. If the user selects the feature 484, in one example, the service application can display a user interface to receive, via a gesture using a finger or pointing device, a signature to confirm that the package has been picked up by the user (e.g., by receiving a signature from the requester that wanted the package to be delivered). When the sub-task(s) is completed, the user can select the "complete" feature to indicate that the overall task of picking up the package has been completed.

Other detailed instructions can be displayed in a task panel of the task user interface when the task panel is displayed in prominence. For a task corresponding to picking up a requester, for example, the task panel can instruct the user to perform sub-tasks in connection with the task that are specified by the requester or specified by the requester's profile (e.g., install child seat, turn on Wi-Fi, adjust stereo for music, set temperature to 70 degrees, etc.). Similarly, for a task corresponding to dropping off a package, for example, the sub-tasks can correspond to get signature, upload documents, check driver's license and confirm or input date of birth (e.g., for alcohol delivery).

FIGS. 5A and 5B illustrate examples of a schedule user interface displayed on a computing device. As described with respect to FIGS. 1 through 4K, the service application can be operated by the user (e.g., a driver) to receive invitations for services from a service arrangement system. The service application can include a selectable feature(s) that, when selected by the user, enables the user to view a schedule user interface, such as illustrated in FIGS. 5A and 5B. The service application (e.g., the presentation component 130 of the service application 110 of FIG. 1) can generate and display a schedule user interface 500 that includes one or more schedule panels corresponding to one or more tasks the user is to perform in connection with one or more services. If, for example, the user has not yet been assigned to provide a service, the schedule user interface 500 may not include any schedule panels. In these examples, the schedule user interface 500 can be scrolled via user input so that the user can view more information about the user's schedule (e.g., FIG. 5B illustrates the bottom portion of the schedule user interface 500 from FIG. 5A).

In the example of FIGS. 5A and 5B, the user has agreed to provide two location-based services, i.e., transport a first requester, Jennifer, and transport a second requester, Michael. The service arrangement system has determined the specified order in which the user is to provide the services. In this case, the user has been instructed to pick up Jennifer first, then pick up Michael, then drop off Jennifer, and then drop off Michael. The schedule user interface 500 can include a plurality of schedule panels representing each task associated with the services that the user is to perform that are positioned according to the specified order. Depending on implementation, the schedule panels can be graphically formatted differently between each other so that a schedule panel can be displayed in prominence as compared to another schedule panel.

For example, the first schedule panel 520 corresponding to the first task of the first service can be displayed near the top of the schedule user interface 500 because it is the first (or the next) task that is to be performed by the user. The schedule user interface 500 can also display, below or adjacent to the first schedule panel 520, a second schedule panel 530, then a third schedule panel 540, and then a fourth schedule panel 550, based on the order specified by the service arrangement system. The first schedule panel 520 can also be displayed in prominence as compared to the third schedule panel 540, which corresponds to the second task of the first service (e.g., drop off Jennifer). The schedule panel 540 can be minimized or obscured as the second task of the first service is not yet important to the user based on the user's current situation (e.g., as the user has to complete the first task first). In other variations, the second schedule panel 530 may also be minimized or obscured until the first task of the first service is completed by the user. The schedule panels may also include selectable features to enable the user to view and/or select different options (e.g., contact the requester, report an issue, cancel the service, etc.).

In some examples, the schedule user interface 500 can also include, for each schedule panel, a graphic 510 corresponding to what type of task or service the schedule panel corresponds to. The graphic 510 of the first schedule panel 520 can have a green circle representing the start or beginning of a service (e.g., pick up), while the graphic 510 of the third schedule panel 540 can have a red circle representing the end of a service (e.g., drop off). As an addition or an alternative, because each of the four tasks corresponds to transporting a person (as opposed to a package), each graphic 510 can correspond to a silhouette of a person (as opposed to a graphic of a box or a bar code). As the user performs existing tasks (e.g., and individually provides input on a task panel to indicate the completion of a task) and/or as the user receives and accepts additional invitations for services, the service arrangement system can adjust the number of tasks and/or the order of the tasks that the user is to perform. The schedule user interface 500 can display the tasks accordingly.

The schedule user interface 500 can also include a panel (s) corresponding to a location(s) that the user has inputted as part of the user's schedule for the day. For example, the schedule user interface 500 can include a location panel 560 corresponding to a location the user wants to go to and a time when the user wants to go. In FIG. 5B, for example, the user has provided his or her home address as the location the user wants to go to at 6:30 μm. The user may go off duty or offline (and not be available to receive service invitations) when the user goes to such a location. Based on this inputted information, the service arrangement system can arrange services to be provided by that user, if any, so that the user is not inconvenienced with respect to this location and time information. For example, at 6:15 pm, if a transport service request is received from a requester that includes a pickup and destination location, the service arrangement system may select the user only if the pickup and destination location satisfies conditions in which the user is a candidate to provide the service based on the location and time information inputted by the user. The service arrangement system may not select the user if the requester's pickup or destination location is far or not along the way to the user's home. The user can also select the add feature 570 to add additional location and time information in the user's schedule (e.g., lunch break, etc.).

Still further, the schedule user interface 500 can also include an amount indicator 515 that displays the total amount of money earned by the user for a given duration of time. In the examples of FIGS. 5A and 5B, the amount indicator 515 can correspond to the amount of money the user has earned thus for the day. The amount indicator 515 can be configurable by the user in order to display a dollar amount for another duration of time (e.g., for a week). The amount displayed can be generated by the service application by adding up all the fare amounts earned for each completed service. Depending on implementation, the service arrangement system can compute, for each completed service by the user, the fare amount based on the pickup and destination locations, the amount of distance traveled for the service, time spent for providing the service, fees, and/or other costs associated with the service.

According to some examples, the schedule user interface 500 can also include a settings tab (see FIG. 5A) that the user can select to view a settings user interface. The settings user interface can display a plurality of different options that can be selected by the user. The settings user interface can include toggles to turn on or off features, can include the user's financial information in which to receive payments for fares from the service arrangement system, can include toggles to opt into or opt out of receiving invitations for certain services or vehicle types, etc., and/or can include other content that can be accessed by the user to configure the user's profile.

Hardware Diagram

Figure 6:
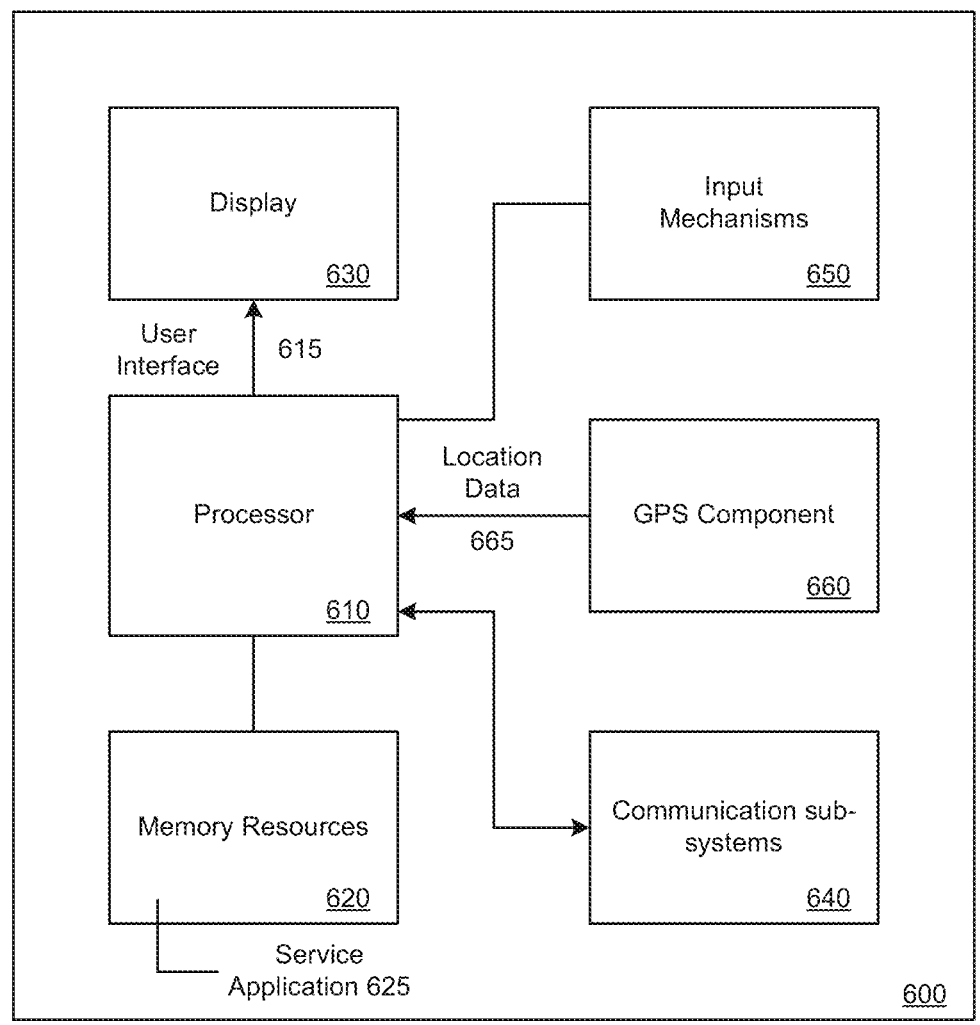
FIG. 6 is a block diagram that illustrates a computing device upon which embodiments described herein may be implemented.

FIG. 6 is a block diagram that illustrates a computing device upon which embodiments described herein may be implemented. In one embodiment, a computing device 600 may correspond to a mobile computing device, such as a cellular device that is capable of telephony, messaging, and data services. The computing device 600 can correspond to a device operated by a requester or, in some examples, a device operated by the user that provides location-based services. Examples of such devices include smartphones, handsets, tablet devices, or in-vehicle computing devices that communicate with cellular carriers. The computing device 600 includes a processor 610, memory resources 620, a display device 630 (e.g., such as a touch-sensitive display device), one or more communication sub-systems 640 (including wireless communication sub-systems), input mechanisms 650 (e.g., an input mechanism can include or be part of the touch-sensitive display device), and one or more location detection mechanisms (e.g., GPS component) 660. In one example, at least one of the communication sub-systems 640 sends and receives cellular data over data channels and voice channels. The communications sub-systems 640 can include a cellular transceiver and one or more short-range wireless transceivers. The processor 610 can exchange data with a service arrangement system (not illustrated in FIG. 6) via the communications sub-systems 640.

The processor 610 can provide a variety of content to the display 630 by executing instructions stored in the memory resources 620. The memory resources 620 can store instructions for the service application 625. For example, the processor 610 is configured with software and/or other logic to perform one or more processes, steps, and other functions described with implementations, such as described by FIGS. 1 through 5B, and elsewhere in the application. In particular, the processor 610 can execute instructions and data stored in the memory resources 620 in order to provide information or content about location-based services based on the user's current situation, as described in FIGS. 1 through 5B. The processor 610 can also execute instructions for presenting a variety of user interfaces 615, such as described in FIGS. 1 through 5B. The content of the user interfaces 615 can be dynamically altered by the service application 625 based on where the user is and/or what tasks the user is to perform or has performed.

In one example, the computing device 500 can periodically determine a location data point 665 of the current location of the computing device 600 from the GPS component 660. In another example, the computing device 600 can determine the current location by using one or more transceivers or a GPS receiver of the communications sub-systems 640. The computing device 600 can periodically transmit a determined location data point 665 to the service arrangement system, such as described in FIGS. 1 through 5B. While FIG. 6 is illustrated for a mobile computing device, one or more examples may be implemented on other types of devices, including full-functional computers, such as laptops and desktops (e.g., PC).

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A non-transitory computer-readable medium storing instructions that, when executed by one or more processors of a computing device, cause the computing device to:
   provide, on a display of the computing device, a task user interface that includes (i) information about a first task of a transport service that a driver is to perform in connection with operating a vehicle, and (ii) information about a first location associated with the first task;
   based on a current location of the computing device being within a threshold distance or a threshold estimated travel time from the first location and prior to completion of the first task, provide, on the display as part of the task user interface, a task panel that includes (i) information that is specific to the first task, (ii) one or more selectable sub-task features that the driver can select in connection with one or more corresponding sub-tasks, and (iii) a selectable feature that the driver selects to indicate that the first task has been completed;
   receive, via the display, a user input corresponding to a selection of the selectable feature; and
   provide, on the display as part of the task user interface, (i) information about a second task of the transport service that the driver is to perform, and (ii) information about a second location associated with the second task.

2. The non-transitory computer-readable medium of claim 1,
   wherein the task user interface is provided on the display in response to the driver accepting a transport invitation to service a transport request.

3. The non-transitory computer-readable medium of claim 2,
   wherein the driver accepts the transport invitation by selecting a selectable acceptance feature provided on the display.

4. The non-transitory computer-readable medium of claim 2, wherein the executed instructions further cause the computing device to:

based on the driver accepting the transport invitation, provide, for a predetermined duration of time, content indicating that the transport service has been added to a schedule of the driver before providing the task user interface.

5. The non-transitory computer-readable medium of claim 4, wherein the executed instructions further cause the computing device to:
receive, via the display, a second user input corresponding to a request to view information about the schedule of the driver; and
in response to receiving the second user input, provide, on the display, a schedule user interface presenting the schedule of the driver.

6. The non-transitory computer-readable medium of claim 5, wherein the schedule user interface includes a first schedule panel corresponding to the first task and a second schedule panel corresponding to the second task.

7. The non-transitory computer-readable medium of claim 6, wherein the first schedule panel is positioned above the second schedule panel in the schedule user interface, and wherein the schedule user interface also includes a third schedule panel positioned below the second schedule panel that corresponds to the second location associated with the second task.

8. The non-transitory computer-readable medium of claim 5, wherein the schedule user interface includes a location panel corresponding to a specified location that the driver is to travel to at a specified time.

9. The non-transitory computer-readable medium of claim 5, wherein the schedule user interface further includes content corresponding to a monetary value that is indicative of an amount earned by the driver.

10. The non-transitory computer-readable medium of claim 1, wherein the task user interface comprises a map that includes a first graphic corresponding to the current location of the computing device and a second graphic corresponding to the first location associated with the first task.

11. A method of generating content, the method being performed by one or more processors of a computing device and comprising:
providing, on a display of the computing device, a task user interface that includes (i) information about a first task of a transport service that a driver is to perform in connection with operating a vehicle, and (ii) information about a first location associated with the first task;
based on a current location of the computing device being within a threshold distance or a threshold estimated travel time from the first location and prior to completion of the first task, providing, on the display as part of the task user interface, a task panel that includes (i) information that is specific to the first task, (ii) one or more selectable sub-task features that the driver can select in connection with one or more corresponding sub-tasks, and (iii) a selectable feature that the driver selects to indicate that the first task has been completed;
receiving, via the display, a user input corresponding to a selection of the selectable feature; and
providing, on the display as part of the task user interface, (i) information about a second task of the transport service that the driver is to perform, and (ii) information about a second location associated with the second task.

12. The method of claim 11, wherein the task user interface is provided on the display in response to the driver accepting a transport invitation to service a transport request.

13. The method of claim 12, wherein the driver accepts the transport invitation by selecting a selectable acceptance feature provided on the display.

14. The method of claim 12, further comprising:
based on the driver accepting the transport invitation, providing, for a predetermined duration of time, content indicating that the transport service has been added to a schedule of the driver before providing the task user interface.

15. The method of claim 14, further comprising:
receiving, via the display, a second user input corresponding to a request to view information about the schedule of the driver; and
in response to receiving the second user input, providing, on the display, a schedule user interface presenting the schedule of the driver.

16. The method of claim 15, wherein the schedule user interface includes a first schedule panel corresponding to the first task and a second schedule panel corresponding to the second task.

17. The method of claim 16, wherein the first schedule panel is positioned above the second schedule panel in the schedule user interface, and wherein the schedule user interface also includes a third schedule panel positioned below the second schedule panel that corresponds to the second location associated with the second task.

18. The method of claim 15, wherein the schedule user interface includes a location panel corresponding to a specified location that the driver is to travel to at a specified time.

19. The method of claim 15, wherein the schedule user interface further includes content corresponding to a monetary value that is indicative of an amount earned by the driver.

20. A computing device comprising:
a location-aware resource;
a display;
one or more processors; and
a memory storing instructions that, when executed by the one or more processors, cause the computing device to:
provide, on the display, a task user interface that includes (i) information about a first task of a transport service that a driver is to perform in connection with operating a vehicle, and (ii) information about a first location associated with the first task;
based on a current location of the computing device being within a threshold distance or a threshold estimated travel time from the first location and prior to completion of the first task, provide, on the display as part of the task user interface, a task panel that includes (i) information that is specific to the first task, (ii) one or more selectable sub-task features that the driver can select in connection with one or more corresponding sub-tasks, and (iii) a selectable feature that the driver selects to indicate that the first task has been completed;
receive, via the display, a user input corresponding to a selection of the selectable feature; and
provide, on the display as part of the task user interface, (i) information about a second task of the transport service that the driver is to perform, and (ii) information about a second location associated with the second task.

* * * * *